United States Patent [19]
Toda et al.

[11] Patent Number: 5,712,540
[45] Date of Patent: Jan. 27, 1998

[54] CONTROL METHOD AND APPARATUS FOR CONTROLLING MOTORS OF AIR CONDITIONER

[75] Inventors: Koichi Toda, Kawasaki; Yoshio Ogawa, Tokyo, both of Japan

[73] Assignee: Fujitsu General Limited, Japan

[21] Appl. No.: 505,397

[22] Filed: Jul. 21, 1995

[30] Foreign Application Priority Data

Jul. 26, 1994 [JP] Japan .................................. 6-193664

[51] Int. Cl.$^6$ .................................................. H02K 17/34
[52] U.S. Cl. .................. 318/46; 318/34; 318/53; 363/58
[58] Field of Search ................ 318/46, 34, 53, 318/798–815; 363/58, 132, 44, 37; 62/230

[56] References Cited

U.S. PATENT DOCUMENTS

| | | | |
|---|---|---|---|
| 5,153,489 | 10/1992 | Unsworth et al. | 318/798 X |
| 5,184,057 | 2/1993 | Sakai et al. | 318/803 |
| 5,210,684 | 5/1993 | Nam | 363/37 |
| 5,299,432 | 4/1994 | Nakae et al. | 318/798 X |
| 5,375,429 | 12/1994 | Tokizaki et al. | 62/230 X |

Primary Examiner—Karen Masih
Attorney, Agent, or Firm—Adams & Wilks

[57] ABSTRACT

A control apparatus for controlling motors of an air conditioner comprises a converter circuit having switching circuitry for converting AC power to DC power and setting an input voltage of an input alternating current waveform to a sine wave of the same phase as that of an input voltage, first and second brushless motors for driving a compressor and a blower, first and second inverter circuits for converting the converted DC power to AC power and supplying AC power to the first and second brushless motors, and a microcomputer for controlling the compressor and the blower of the air conditioner. The microcomputer is constructed in such a manner that input and output operations which are necessary to control the air conditioner are executed for input and output circuits, thereby controlling at least the compressor and the blower of the air conditioner. To improve the input power factor from the AC power, a PWM signal for controlling the ON/OFF state of the switching circuitry of the converter circuit is generated by the microcomputer on the basis of the input alternating current of the AC power and the output DC voltage of the converter circuit. At the same time, PWM signals for controlling the ON/OFF state of switching circuitry of the inverter circuits are generated by the microcomputer to control the first and second motors.

23 Claims, 13 Drawing Sheets (a) HALL ELEMENT OUTPUT SIGNAL
(b) HALL ELEMENT OUTPUT SIGNAL
(c) HALL ELEMENT OUTPUT SIGNAL
(d) DRIVE SIGNAL Ub1
(e) DRIVE SIGNAL Vb1
(f) DRIVE SIGNAL Wb1
(g) DRIVE SIGNAL Xb1
(h) DRIVE SIGNAL Yb1
(i) DRIVE SIGNAL Zb1
(j) ALTERNATING VOLTAGE
(k) ALTERNATING VOLTAGE
(L) ALTERNATING VOLTAGE
(m) SWITCHING SIGNAL

CONTROL METHOD AND APPARATUS FOR CONTROLLING MOTORS OF AIR CONDITIONER

FIELD OF THE INVENTION

The invention relates to a control method and an apparatus for controlling motors for a compressor and a blower of an air conditioner. More particularly, the invention relates to a control method and an apparatus for controlling the motors of an air conditioner in which the compressor and blower are controlled by a single microcomputer and a converter to obtain a DC voltage necessary for an inverter to drive the compressor and blower.

DESCRIPTION OF THE RELATED ART

Hitherto, a known air conditioner has means for controlling motors to drive a compressor and a blower, respectively. For example, during control of the motor for driving the compressor, a commercially available AC power is converted to a DC power and the converted DC power is converted to an arbitrary AC voltage by the control means and is supplied to the motor for the compressor. A capacitor input type converter is generally used as converting means for converting the AC power to the DC power. However, since an input alternating current waveform from the AC power becomes a distorted wave, a power factor deteriorates and a harmonics current is generated.

Therefore, various converters for setting an input alternating current waveform to a sine wave of the same phase as that of an input voltage, for improving an input power factor, and for reducing the harmonics have been proposed. The air conditioner using the converter drives the motors for the compressor and the blower and is controlled by a microcomputer. An example of a control of this type will be described in detail with reference to FIG. 10.

A control apparatus of the air conditioner comprises a converter circuit 2 for converting a commercially available AC power to a DC power, a first inverter circuit 4 for converting an output DC voltage of the converter circuit 2 to a predetermined AC voltage and supplying the AC voltage to a first brushless motor 3 for a compressor, a converter control circuit 5 for outputting an IGBT control signal in accordance with an input current (rectified current), an input voltage (rectified voltage), and an output voltage of the converter circuit 2, the IGBT control signal for on/off driving an IGBT (transistor) 2a used as a switching means of the converter circuit 2, a position detecting circuit 6 for detecting the position of a rotor of the brushless motor 3 by a terminal voltage of the first brushless motor 3, a microcomputer 7 for inputting the detected position detecting signals and outputting an inverter control signal (PWM signal) for on/off controlling at least a plurality of transistors Ua, Va, Wa, Xa, Ya, and Za of the first inverter circuit 4 on the basis of the inputted position detecting signals, and an upper arm drive circuit 8 and a lower arm drive circuit 9 for inputting such a control signal and on/off driving the transistors Ua, Va, Wa, Xa, Ya, and Za. The control apparatus of the air conditioner further comprises a chopping circuit 10 for chopping as desired the on portions of output drive signals of the upper arm drive circuit 8 by a chopping signal from the microcomputer 7, a switching power supply 11 for converting a commercial AC power 1 to a predetermined DC power, a second inverter circuit 13 for converting an output DC voltage of the switching power supply 11 to a predetermined AC voltage and supplying the AC voltage to a second brushless motor 12 used for driving an outdoor blower unit, and a brushless motor control circuit 14 for inputting position detecting signals of a rotor of the second brushless motor 12 generated from a Hall element 12a in the brushless motor 12, for inputting a rotational speed command signal from the microcomputer 7, and for outputting an inverter control signal to turn on/off at least a transistor 11d as switching means of the switching power supply 11 and to turn on/off a plurality of transistors Ub, Vb, Wb, Xb, Yb, and Zb of the second inverter circuit 13 on the basis of the inputted position detecting signals.

In addition to the IGBT 2a of the switching means, the converter circuit 2 comprises a rectifying circuit 2b for rectifying the commercial AC power 1 to the direct current, a reactor 2c, a diode 2d for blocking a reverse current, and a smoothing capacitor 2e. The converter circuit 2 converts the commercial AC power 1 to the DC power and supplies a predetermined DC voltage to the first inverter circuit 4. The first inverter circuit 4 is constructed with an upper arm comprising three transistors Ua, Va, and Wa for switching the connections between a positive terminal of the converter circuit 2 and three-phase windings a1, b1, and c1 of the first brushless motor 3, and a lower arm comprising three transistors Xa, Ya, and Za for switching the connections between the 3-phase windings a1, b1, and c1 and a negative terminal of the converter circuit 2.

The converter control circuit 5 comprises a current detecting circuit, two voltage detecting circuits, an IGBT driving circuit, an exclusive-use IC for a converter control having a PWM signal generating circuit constructed by an oscillator, a multiplier, a comparator, etc., and the like. The converter control circuit 5 detects the input current using a current sensor 5a, detects the voltage waveform obtained by rectifying the AC voltage, detects the output DC voltage, and generates a control signal [PWM signal: shown in FIG. 11(a)] for controlling the IGBT 2a of the converter circuit 2 in accordance with the detected current and voltage such that the input AC current from the AC power has a sine wave of the same phase as that of the input AC line voltage (shown in FIG. 11(b)).

The microcomputer 7 inputs the position detecting signals [shown in (a) to (c) in FIG. 12] from the position detecting circuit 6 and generates drive signals Ua1, Va1, Wa1, Xa1, Ya1, and Za1 shown in (d) to (i) in FIG. 12 to the upper arm drive circuit 8 and lower arm drive circuit 9 in order to turn on as desired the transistors Ua, Va, and Wa of the upper arm and the transistors Xa, Ya, and Za of the lower arm of the first inverter circuit 4 on the basis of the position detecting signals so as to rotate the first brushless motor 3, respectively.

The microcomputer 7 outputs a chopping signal shown in (j) in FIG. 12 to the chopping circuit 10. The chopping circuit 10 chops a power source of the upper arm drive circuit 8 on the basis of the inputted chopping signal in order to chop as desired an output signal of, for example, the upper arm drive circuit 8 on the basis of the input chopping signal.

Thus, the PWM signals Ua1, Va1, and Wa1 in which the ON portions of input drive signals shown in (k) to (m) in FIG. 12 were chopped are output from the upper arm drive circuit 8 to the transistors Ua, Va, and Wa of the upper arm of the inverter circuit 4. The signals Xa1, Ya1, and Za1 shown in (n) to (p) in FIG. 12 are output from the lower arm drive circuit 9 to the transistors Xa, Ya, and Za of a lower arm of the inverter circuit 4 on the basis of the input drive signals.

The transistors Ua, Va, Wa, Xa, Ya, and Za of the upper and lower arms of the first inverter circuit 4 are turned on in a desired manner by output signals of the upper arm drive circuit 8 and lower arm drive circuit 9. The connections between the positive and negative terminals of the inverter circuit 4 and the 3-phase windings a1, b1, and c1 of the first brushless motor 3 are switched. Thus, the DC voltage from the converter circuit 2 is converted to the AC voltage and is applied to the 3-phase windings a1, b1, and c1 of the first brushless motor 3. At the same time, the transistors Ua, Va, and Wa of the upper arm are chopping driven by the output signal of the upper arm drive circuit 8 when they are turned on. Therefore, the chopped AC voltages shown in (q) to (s) in FIG. 12 are applied to the 3-phase windings a1, b1, and c1 of the first brushless motor 3.

In the microcomputer 7, an on/off ratio of the chopping signal which is supplied to the chopping circuit 10 is made variable in order to set a rotational speed of the first brushless motor 3 to a predetermined rotational speed. An on/off ratio of the chopping of AC voltages which are applied to the 3-phase windings a1, b1, and c1 of the first brushless motor 3 is made variable, thereby varying the applied voltages and controlling the rotation of the first brushless motor 3.

On the other hand, in the switching power supply 11, the commercial AC power 1 is converted to the DC power by a rectifying circuit 11a and a smoothing capacitor 11b and a predetermined DC voltage is generated. The DC voltage is switched and converted to the variable DC voltage by a transformer 11c, a transistor 11d, a diode 11e, and a smoothing capacitor 11f. The variable DC voltage is supplied to the second inverter circuit 13 comprising six transistors Ub, Vb, Wb, Xb, Yb, and Zb. The second brushless motor 12 has therein the position detecting sensor (Hall element) 12a. The Hall element 12a detects the position of a rotor of the second brushless motor 12 and generates position detecting signals shown in (a) to (c) in FIG. 13.

The brushless motor control circuit 14 which receives the position detecting signals from the Hall element 12a is constructed by, for example, an exclusive-use IC for brushless motor control and the like. The brushless motor control circuit 14 outputs drive signals Ub1, Vb1, Wb1, Xb1, Yb1, and Zb1 shown in (d) to (i) in FIG. 13 to the transistors Ub, Vb, Wb, Xb, Yb, and Zb of the second inverter circuit 13 on the basis of the inputted position detecting signals so as to rotate the second brushless motor 12.

The transistors of the second inverter circuit 13 are turned on as desired by those drive signals. The variable DC voltage from the switching power supply 11 which is inputted to the inverter circuit 13 is converted to the AC voltages shown in (j) to (l) in FIG. 13 and applied to 3-phase windings a2, b2, and c2 of the second brushless motor 12.

Further, the microcomputer 7 generates a rotational speed command signal of the second brushless motor 12. The brushless motor control circuit 14 which receives the rotational speed command signal generates a signal to switching control the transistor 11d of the switching power supply 11 [shown at (m) in FIG. 13]. The brushless motor control circuit 14 varies the on/off ratio of the above switching signal on the basis of the inputted rotational speed command signal and varies the DC voltage that is generated from the switching power supply 11. The varied DC voltage is converted to the variable AC voltage by the inverter circuit 13 and applied to the 3-phase windings a2, b2, and c2 of the second brushless motor 12. Since the AC voltage which is applied to the 3-phase windings a2, b2, and c2 is made variable, the second brushless motor 12 is variable-speed controlled.

In the control method of the air conditioner described above, however, three independent and distinct control means such as the converter control circuit 5, microcomputer 7, and brushless motor control circuit 14 are necessary in order to perform the functions of improving the input power factor, controlling the converter circuit 2 for reducing the harmonic current, and controlling the rotation of the motors (first and second brushless motors 3 and 12) to drive the compressor and blower which are necessary for the air conditioner. In order to drive the second brushless motor 12, the switching power supply 11 for varying the DC voltage and outputting is needed. Further, a control circuit and a power supply circuit of the air conditioner are also complicated. The number of parts is large. The reliability is deteriorated. The need for three independent control means becomes a factor in the increase in cost and size of the air conditioner.

In the rotation control of the second brushless motor 12, the on/off ratio of the switching signal is determined by only the rotational speed command signal from the microcomputer 7. The value of the DC voltage that is outputted from the switching power supply 11 is thus decided. Therefore, the rotational speed of the second brushless motor 12 fluctuates in association with a fluctuation of a load. The actual rotational speed does not coincide with the rotational speed decided by the rotational speed command signal. Namely, there is a problem such that the second brushless motor 12 does not rotate in accordance with the rotational speed command signal.

SUMMARY OF THE INVENTION

It is an object of the invention to provide a control method and control apparatus of an air conditioner, in which a converter, a compressor, and a blower of the air conditioner can be controlled by a single microcomputer of the air conditioner.

A control apparatus according to the invention comprises converter means for converting an AC power to a DC power and for converting an input AC current waveform to a sine wave of the same phase as that of an input voltage using at least a switching means, a plurality of motors, one for driving a compressor and one for driving a blower, a plurality of inverters for converting the converted DC power to AC power and for supplying the AC power to each of the motors; and a microcomputer for controlling at least the compressor and blower of the air conditioner, wherein the control apparatus further comprises a configuration in: the plurality of inverters are connected in parallel and receive an output DC power from the converter, converter control means for outputting a control signal to control the switching means in accordance with at least the input AC current from the microcomputer and the output DC voltage of the converter, and inverter control means for outputting a control signal to control the plurality of inverters.

With such a construction, the microcomputer executes input/output operations from/to input/output circuits which are necessary for the air conditioner, thereby controlling the air conditioner. At the same time, the microcomputer generates a PWM signal to turn on-off the switching means of the converter in a manner such that the input alternating current from the commercially available AC power is set to a sine wave having the same phase as that of the input AC voltage and the input power factor from the commercially available AC power is improved.

Further, simultaneously with the above operation, the microcomputer also generates the PWM signal for on/off controlling the switching means of each inverter in order to inverter control each of the motors (brushless motors or induction motors) to drive the compressor and blower which are necessary for the air conditioner.

Therefore, the control of the air conditioner, the control of the switching means of the converter, and the inverter control of the motors for the compressor and blower which are necessary for the air conditioner are executed by the microcomputer as single control means.

Since the output DC voltage of the sole converter is applied to each motor, each motor is driven by a single power circuit. Thus, the number of parts can be reduced, the reliability can be improved, and the costs and size of the air conditioner can be reduced.

DETAILED DESCRIPTION OF THE PREFERRED EMBODIMENTS

Figure 1:
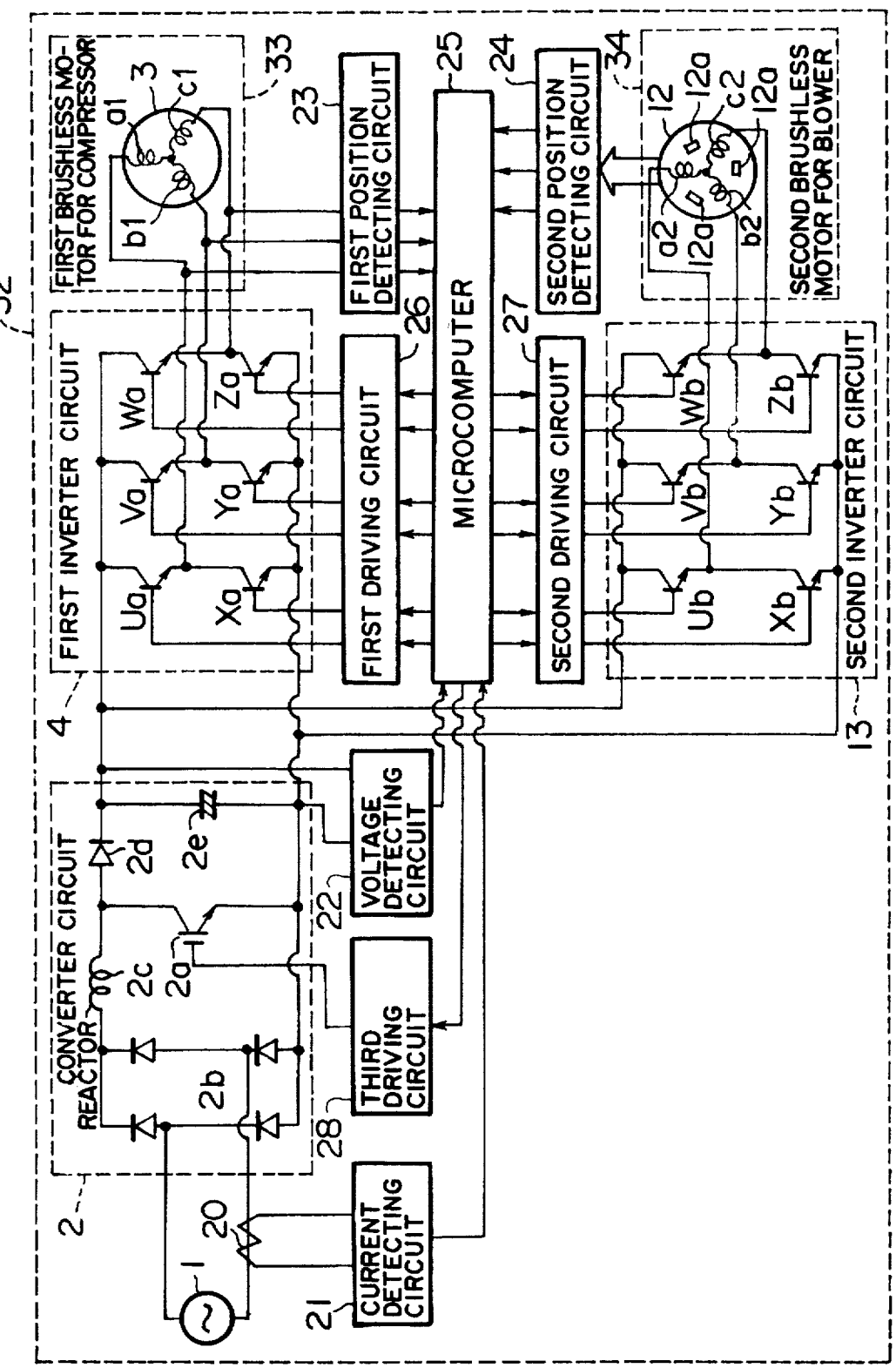
FIG. 1 is a schematic block diagram showing an embodiment of a control apparatus of an air conditioner of the invention.

A control method and apparatus for controlling motors of an air conditioner according to the invention will now be described in detail with reference to the drawings. In the diagrams, the same and corresponding portions as those in FIG. 10 are designated by the same reference numerals and thereof overlapped descriptions are omitted.

Figure 10:
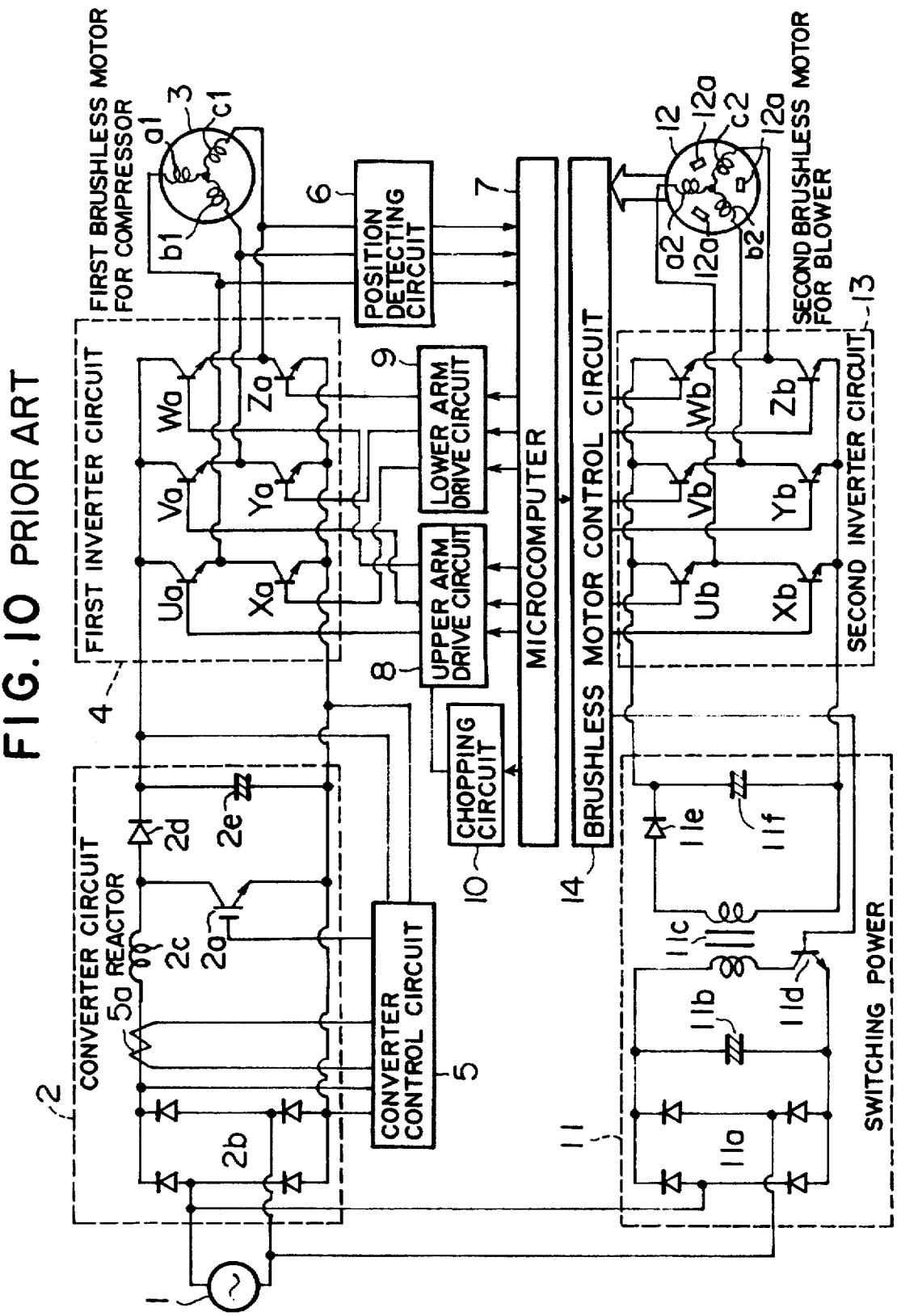
FIG. 10 is a schematic block diagram of a known control apparatus of an air conditioner.
Figure 11:
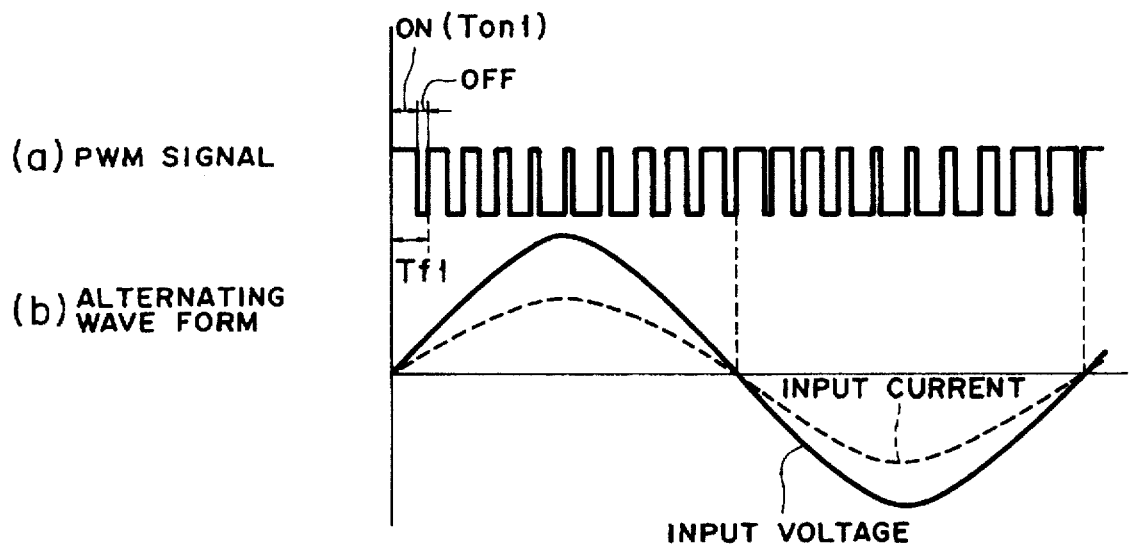
FIG. 11 is a timing chart for explaining the operation of the control apparatus shown in FIG. 10.

In FIG. 1, a control apparatus 32 of the air conditioner comprises a current sensor 20 and a current detecting circuit 21 for detecting an input alternating current of a converter circuit 2, a voltage detecting circuit 22 to detect the output DC voltage of the converter circuit 2, a first position detecting circuit 23 having the same construction as that of a position detecting circuit 6 shown in FIG. 10, a second position detecting circuit 24 for outputting position detecting signals of the rotor of a brushless motor 12 to drive a blower 34. A microcomputer 25 is included for performing various input/output operations which are necessary to control the air conditioner. These input/output operations include for inputting a current detecting signal from the current detecting circuit 21, the voltage detecting signal from the voltage detecting circuit 22, the position detecting signals from the first position detecting circuit 23, and the position detecting signals from the second position detecting circuit 24, turning on or off an IGBT (transistor) 2a included in the converter circuit 2, outputting a control signal [an inverter control signal (PWM signal)] in which an on ratio is varied, and for outputting control signals (including the PWM signal) for respectively controlling first and second inverter circuits 4 and 13 in addition to the functions (function to output the PWM signal, and the like) of the microcomputer 7 shown in FIG. 10. The control apparatus 32 of the air conditioner further comprises first and second driving circuits 26 and 27 for respectively driving the plurality of transistors of first and second inverter circuits 4 and 13 by the control signals from the microcomputer 25, and a third driving circuit 28 to turn on/off the IGBT 2a by the PWM signal from the microcomputer 25.

The operation of the control apparatus 32 of the air conditioner will now be described. The microcomputer 25 controls an outdoor apparatus and supplies the PWM signal for switching as desired the IGBT 2a of the converter circuit 2 to the third driving circuit 28 in accordance with the detecting signals from the current detecting circuit 21 and voltage detecting circuit 22. The microcomputer 25 also inputs the position detecting signals of the rotor of a first brushless motor 3 for a compressor 33 from the first position detecting circuit 23 and generates control signals for controlling the six transistors Ua, Va, Wa, Xa, Ya, and Za of the first inverter circuit 4. At the same time, the microcomputer 25 inputs the position detecting signals of the rotor of the second brushless motor 12 for the blower 34 from the second position detecting circuit 24 and generates control signals for controlling the six transistors Ub, Vb, Wb, Xb, Yb, and Zb of the second inverter circuit 13.

The current detecting circuit 21 comprises, for example, a rectifying diode and a resistor circuit and converts the input alternating current waveform detected by the current sensor 20 to a level (voltage value) which can be inputted to the microcomputer 25.

The voltage detecting circuit 22 comprises, for example: a voltage dividing resistor circuit for dropping the output DC voltage of the converter circuit 2 and a photocoupler circuit for insulating the microcomputer 25 from the analog voltage value and converting it to digital signal having binary values (H, L) and supplying the digital signal to the microcomputer 25. A voltage dividing ratio of the voltage dividing resistor circuit of the voltage detecting circuit 22 is set in a manner such that, when the output DC voltage of the converter circuit 2 is equal to or less than a predetermined value [for example, 300 V shown in (a) in FIG. 2] or less, an output of the photocoupler circuit is set to the H level and, when the output DC voltage exceeds the predetermined value, the output of the photocoupler circuit is set to the L level. Thus, the voltage detecting signal from the voltage detecting circuit 22 is set to the H or L level. The H or L level signal is supplied to the microcomputer 25.

The voltage detecting circuit 22 can also output an analog value according to a difference between the output DC voltage of the converter circuit 2 and a predetermined value. In this case, it is sufficient that the analog signal from the voltage detecting circuit 22 is inputted to an A/D conversion input port of the microcomputer 25.

A control method of the converter circuit 2 used in the control apparatus 32 of the air conditioner will now be described with reference to a timing chart of FIG. 2.

Figure 2:
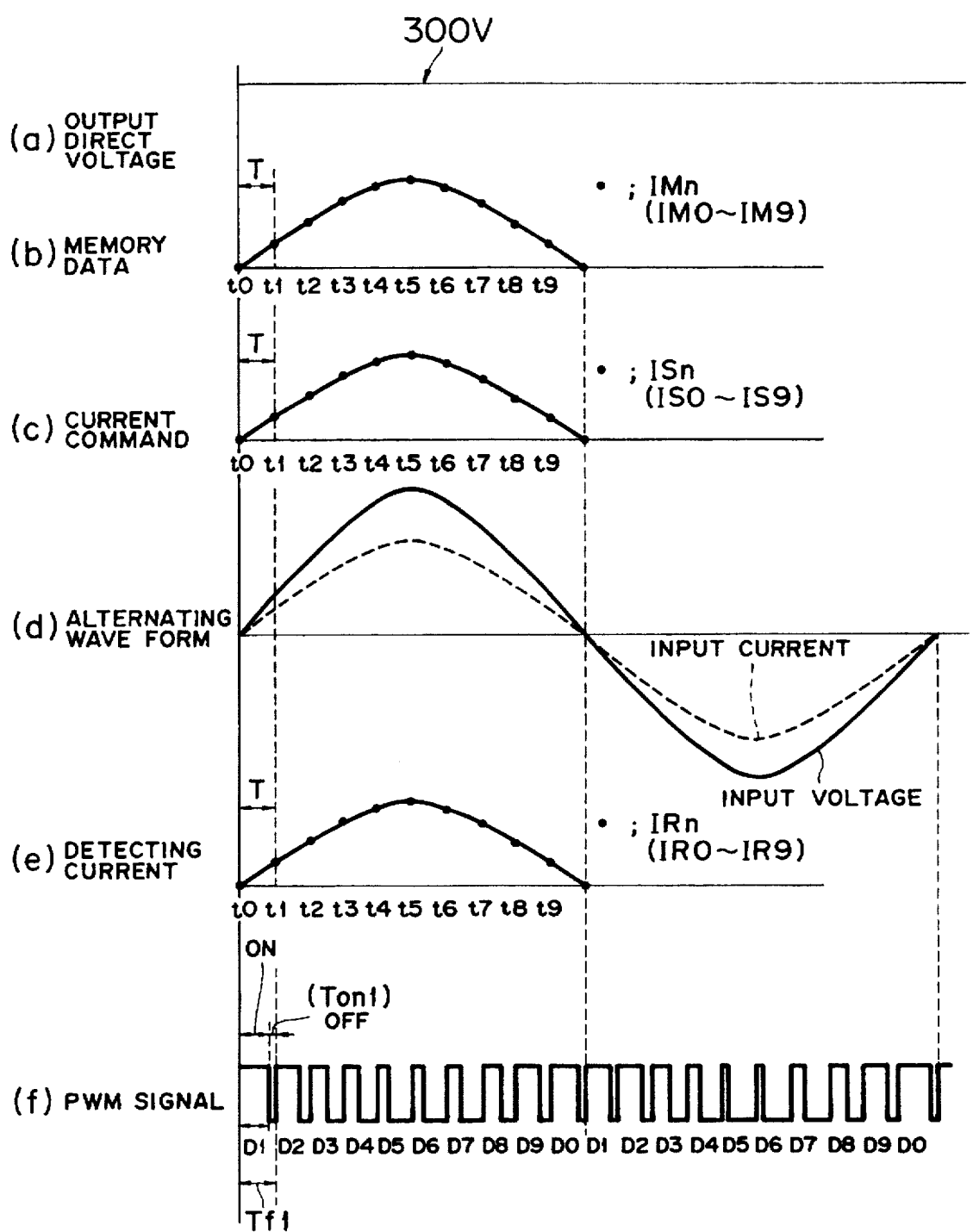
FIG. 2 is a schematic timing chart for explaining the operation and control method of the control apparatus shown in FIG. 1.

First, the microcomputer 25 calculates a current command ISn shown in (c) in FIG. 2 on the basis of data [IMn shown in (b) in FIG. 2; n is an integer] which has previously been stored in an internal memory and the detecting signal (H or L level) of the output DC voltage of the converter circuit 2 which was inputted. The memory data IMn is sine wave data (fundamental data) of the half period of the input alternating current.

As a calculating method of the current command ISn, the voltage detecting signal from the voltage detecting circuit 22 is detected every predetermined time [for instance, zero-cross point of the input AC waveform shown in (d) in FIG. 2] and, when it is at the H level (300 V or less), a predetermined ratio of the memory data is added to the memory data IMn, thereby setting to the current command ISn. Until the voltage detecting signal is set to the L level (exceeding 300 V), the predetermined ratio of the memory data is added to the memory data IMn, thereby increasing the current command ISn. On the contrary, when the voltage detecting signal is at the L level (exceeding 300 V), the predetermined ratio of the memory data is subtracted from the memory data IMn, thereby setting to the current command ISn. Until the voltage detecting signal is set to the H level (300 V or less), the predetermined ratio of the memory data is subtracted, thereby decreasing the current command ISn.

On the basis of the current command ISn calculated in this manner, the IGBT 2a of the converter circuit 2 is turned on or off as desired, thereby setting the output DC voltage of the converter circuit 2 to the predetermined value (300 V).

The current detecting circuit 21 detects the input alternating current and supplies the current detecting signal to the microcomputer 25. The microcomputer 25 detects a current value IRn shown in (e) in FIG. 2 by the current detecting signal at a time tn (t0 to t9) of every predetermined time internal T from a zero-cross point (t0). The zero-cross point (t0) is detected by a detecting signal from a zero-cross detecting circuit which is used for judgment of a frequency of the input alternating current or the like as one of the existing input/output circuits of the outdoor apparatus.

The current command ISn [shown in (c) in FIG. 2] at time tn is subsequently compared with the detecting current IRn [shown in (e) in FIG. 2]. When ISn>IRn, an ON time Dn of the PWM signal to control the IGBT 2a of the converter circuit 2 is increased by only a predetermined value. When ISn<IRn, the ON time Dn of the PWM signal to control the IGBT 2a of the converter circuit 2 is decreased by only the predetermined value [refer to (f) in FIG. 2].

Thus, the input alternating current from the commercial AC power 1 can be controlled to the sine wave having the same phase as that of the input AC voltage as shown in (d) in FIG. 2. In this instance, as already been described above, the output DC voltage of the converter circuit 2 is also controlled to the predetermined value.

On the other hand, as will be by those ordinary skill in the art understood from FIG. 1, the first and second inverter circuits 4 and 13 are connected in parallel with the output of the converter circuit 2. The first inverter circuit 4 drives the first brushless motor 3 for the compressor 33. The second inverter circuit 13 drives the second brushless motor 12 for the blower 34. The first and second brushless motors 3 and 12 are 3-phase motors and are controlled by the single microcomputer 25 to control the outdoor apparatus and the IGBT 2a of the converter circuit 2.

The second position detecting circuit 24 comprises, for example, comparator means and amplifier means and inputs signals from three Hall elements 12a provided in the second brushless motor 12 and supplies the position detecting signals of the rotor of the second brushless motor 12 to the microcomputer 25.

The second inverter circuit 13 is constructed by an upper arm comprising three transistors Ub, Vb, and Wb for switching the connections between a positive terminal of the converter circuit 2 and the 3-phase windings a2, b2, and c2 of the second brushless motor 12 and a lower arm comprising three transistors Xb, Yb, and Zb for switching the connections between the 3-phase windings a2, b2, and c2 and a negative terminal of the converter circuit 2.

In FIG. 1, the first driving circuit 26 has a construction such that the upper arm drive circuit 8 and lower arm drive circuit 9 shown in FIG. 10 are unified. The second driving circuit 27 has a construction similar to that of the driving circuit 26.

A control method will now be described with reference to a timing chart of FIG. 3. First, it is assumed that the microcomputer 25 controls the compressor 33 and blower 34 of the outdoor apparatus in accordance with commands or the like from a control apparatus of an indoor apparatus.

Figure 3:
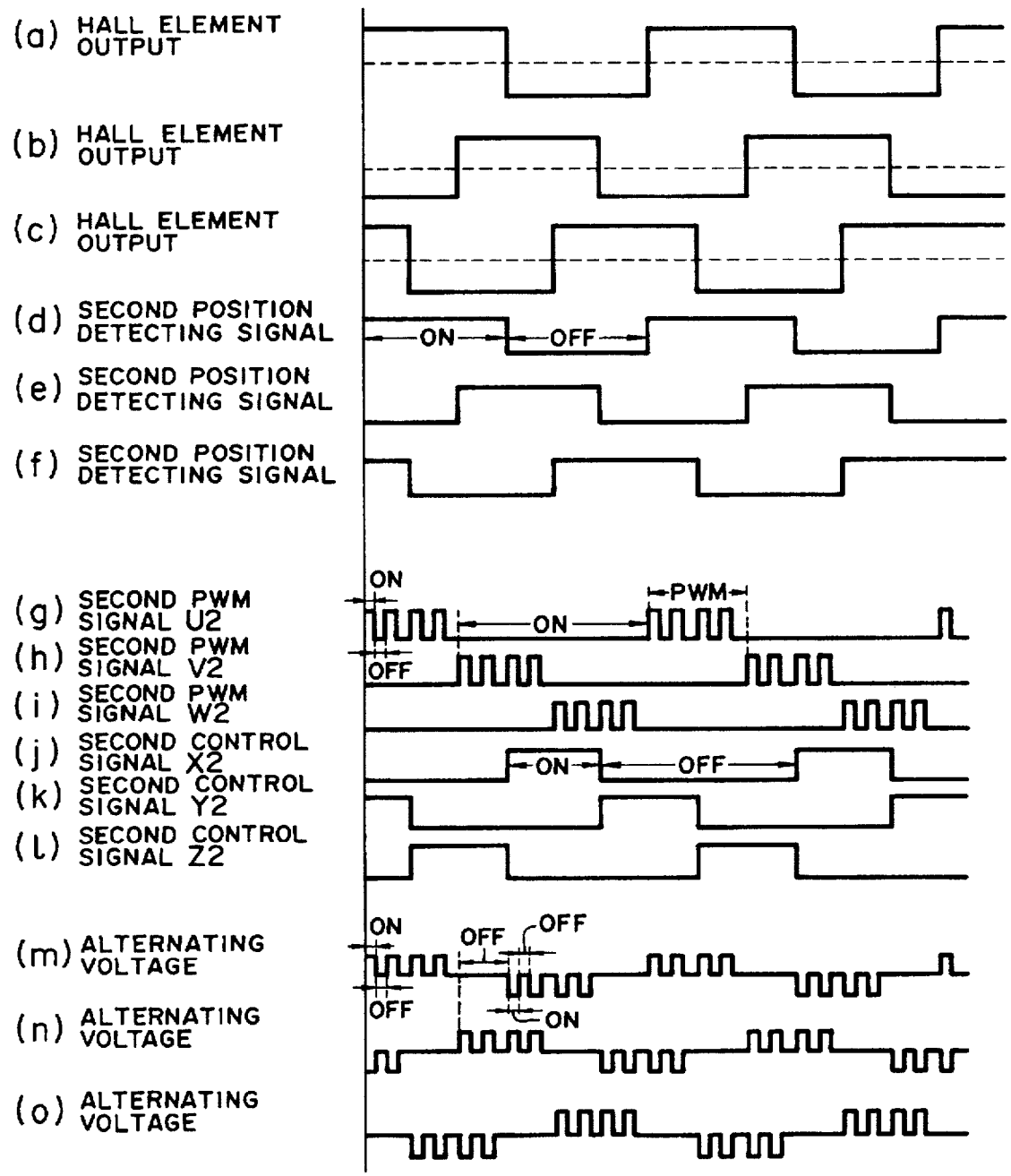
FIG. 3 is a schematic timing chart for explaining the operation and control method of the control apparatus shown in FIG. 1.

The signals [shown in (a) to (c) in FIG. 3] from the Hall elements 12a in the second brushless motor 12 are supplied to the second position detecting circuit 24. The second position detecting circuit 24 outputs position detecting signals shown in (d) to (f) in FIG. 3 to the microcomputer 25.

The microcomputer 25 turns on in a desired sequence the transistors Ub, Vb, Wb, Xb, Yb, and Zb of the second inverter circuit 13 on the basis of the input position detecting signals so as to rotate the second brushless motor 12, switches the connections between the positive and negative terminals of the converter circuit 2 and the 3-phase windings a2, b2, and c2 of the second brushless motor 12, converts the DC voltages from the converter circuit 2 to the AC voltages, applies the AC voltages to the 3-phase windings a2, b2, and c2, and generates therein the control signals U2, V2, W2, X2, Y2, and Z2 to rotate the second brushless motor 12.

In this instance, the microcomputer 25 sets the ON portions of the control signals for turning on as desired the transistors Ub, Vb, and Wb of at least one of the upper and lower arms, for instance, the upper arm of the second inverter circuit 13 among the generated control signals to chopping signals of a predetermined on/off ratio for turning on/off the transistors Ub, Vb, and Wb of the upper arm by a frequency higher than the frequency of the control signals in the microcomputer 25. Thus, the control signals U2, V2, and W2 [shown in (g) to (i) in FIG. 3] using the ON portions as chopping signals and the other control signals X2, Y2, and Z2 [shown in (j) to (l) in FIG. 3] are generated from the microcomputer 25. The generated control signals U2, V2, W2, X2, Y2, and Z2 are supplied to the second inverter circuit 13 through the second driving circuit 27. The transistors Ub, Vb, Wb, Xb, Yb, and Zb of the second inverter circuit 13 are turned on as desired. At the same time, when the transistors Ub, Vb, and Wb of the upper arm are ON, they are turned on/off by the chopping signals of the control signals.

The DC voltages from the converter circuit 2 are converted to the AC voltages and are chopped. The AC voltages are set to predetermined voltages. AC voltages shown in (m) to (o) in FIG. 3 are applied to the 3-phase windings a2, b2, and c2 of the second brushless motor 12, so that the second brushless motor 12 is rotationally controlled.

With respect to the first brushless motor 3 as well, the rotation is controlled by a method similar to that mentioned above by the microcomputer 25. The microcomputer 25 inputs the position detecting signals which are outputted from the first position detecting circuit 23 and generates therein control signals U1, V1, W1, X1, Y1, and Z1 to turn on as desired the transistors Ua, Va, Wa, Xa, Ya, and Za of the first inverter circuit 4 on the basis of the position detecting signals so as to rotate the first brushless motor 3.

Among the control signals U1, V1, W1, X1, Y1, and Z1, the ON portions of the control signals U1, V1, and W1 to turn on as desired the transistors Ua, Va, and Wa of at least one of the upper arm and lower arm, for example, the upper arm of the first inverter circuit 4 are set to the chopping signals of a predetermined on/off ratio to turn on/off the transistors Ua, Va, and Wa by a frequency higher than the frequency of the control signals in the microcomputer 25. The microcomputer 25 generates the control signals U1, V1, W1, X1, Y1, and Z1 including the drive signals serving as chopping signals.

The generated control signals U1, V1, W1, X1, Y1, and Z1 are supplied to the first inverter circuit 4 through the first driving circuit 26. The transistors Ua, Va, Wa, Xa, Ya, and Za of the first inverter circuit 4 are turned on as desired and, at the same time, the transistors Ua, Va, and Wa are chopped at the time of turn-on thereof. Thus, the DC voltage from the converter circuit 2 is converted to the AC voltages and the chopped AC voltages are applied to the 3-phase windings a1, b1, and c1 of the first brushless motor 3, thereby rotationally controlling the first brushless motor 3.

Figure 12:
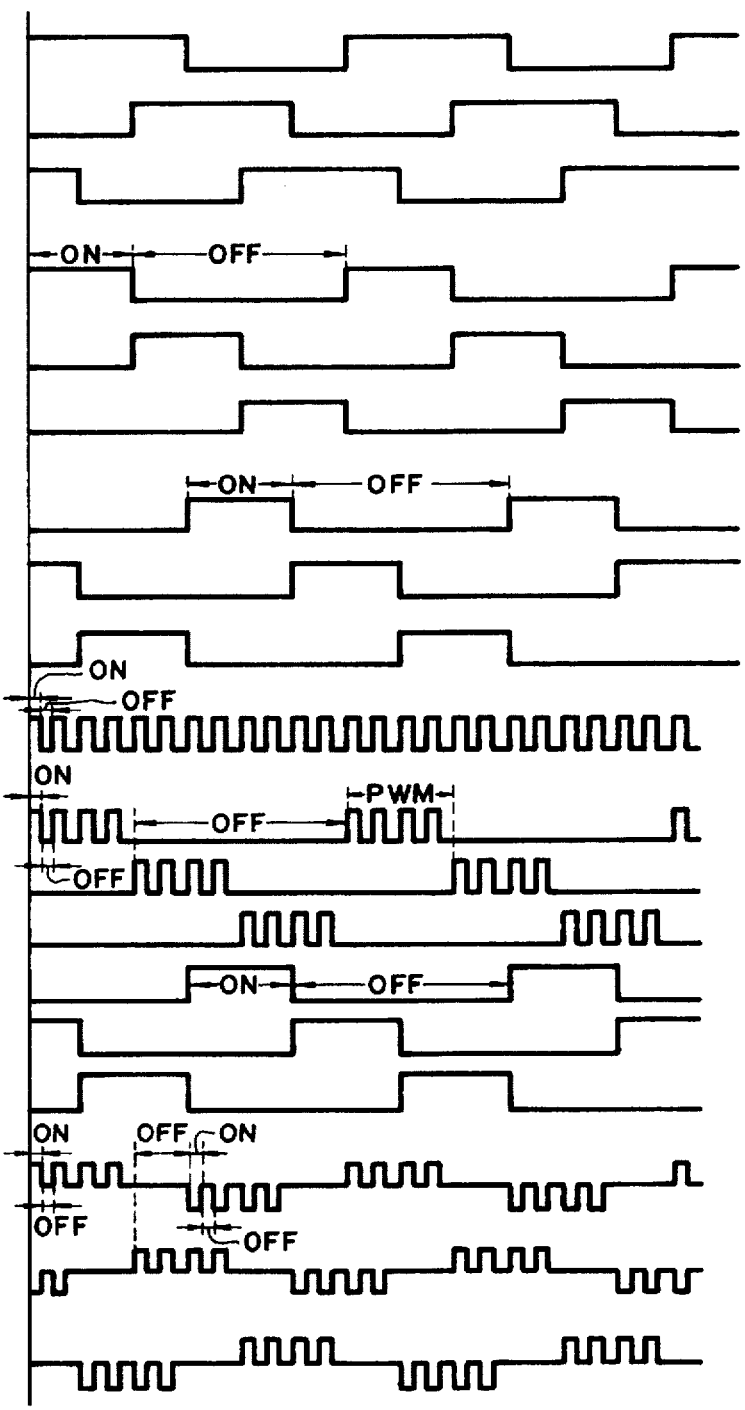
FIG. 12 is a timing chart for explaining the operation of the control apparatus shown in FIG. 10.
Figure 13:
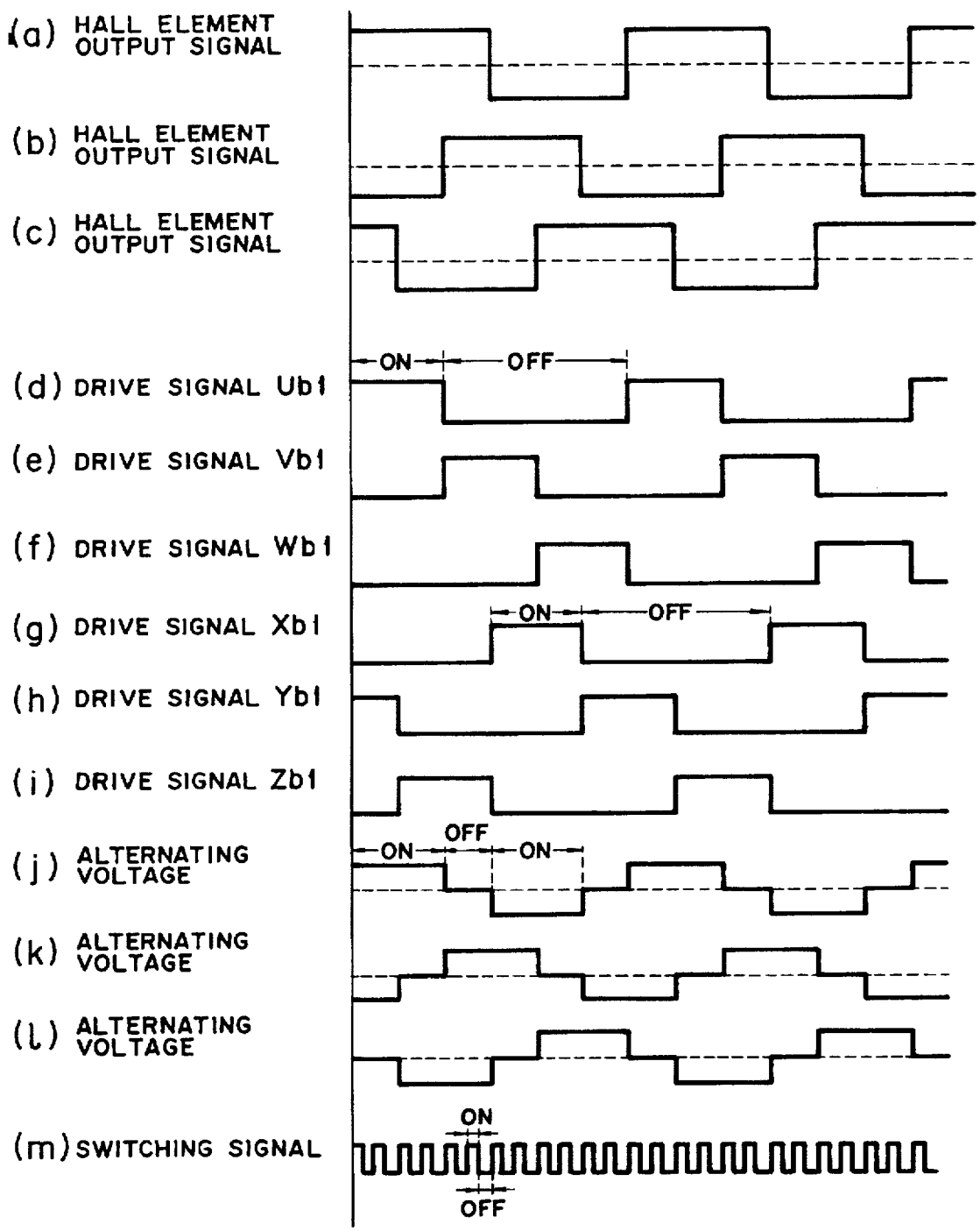
FIG. 13 is a timing chart for explaining the operation of the control apparatus shown in FIG. 10.

The control signals U1, V1, W1, X1, Y1, and Z1 are the same as the signals Ua1, Va1, Wa1, Xa1, Ya1, and Za1 shown in FIG. 12.

The rotation control in the second brushless motor 12 will now be described in detail. The microcomputer 25 calculates the rotational speed of the second brushless motor 12 on the basis of the position detecting signals [shown in (d) to (f) in FIG. 3] inputted through an input port. As a calculating method of the rotational speed, for instance, a time interval between leading edges or trailing edges of the three inputted position detecting signals [shown in (d) to (f) in FIG. 3] is measured, thereby calculating the rotational speed.

The above calculated rotational speed is compared with a predetermined rotational speed of the second brushless motor 12. When the calculated rotational speed is smaller than the predetermined rotational speed, the rotational speed of the second brushless motor 12 is set to the predetermined rotational speed. For this purpose, the ON times of the chopping signals of the drive signals U2, V2, and W2 of the transistors Ub, Vb, and Wb of the upper arm constructing the second inverter circuit 13 are increased (namely, the OFF times are decreased; on/off ratio is varied). Thus, the predetermined AC voltages which are applied to the 3-phase windings a2, b2, and c2 of the second brushless motor 12 are raised and the rotational speed of the second brushless motor 12 is increased.

When the calculated rotational speed is larger than the predetermined rotational speed, in order to set the rotational speed of the second brushless motor 12 to the predetermined rotational speed, the ON times of the chopping signals of the control signals U2, V2, and W2 of the transistors Ub, Vb, and Wb of the upper arm are decreased (namely, OFF times are increased; on/off ratio is varied). Thus, the predetermined AC voltages which are applied to the 3-phase windings a2, b2, and c2 of the second brushless motor 12 are dropped and the rotational speed of the second brushless motor 12 is reduced.

By repeating the above operations, the rotational speed of the second brushless motor 12 is variably controlled and the motor 12 is constantly rotated and controlled at a predetermined rotational speed.

With respect to the first brushless motor 3 as well, a rotation control similar to the rotation control of the second brushless motor 12 is executed. Therefore, the first and second brushless motors 3 and 12 are constantly rotated and controlled at predetermined rotational speeds by the microcomputer, respectively.

Figure 4:
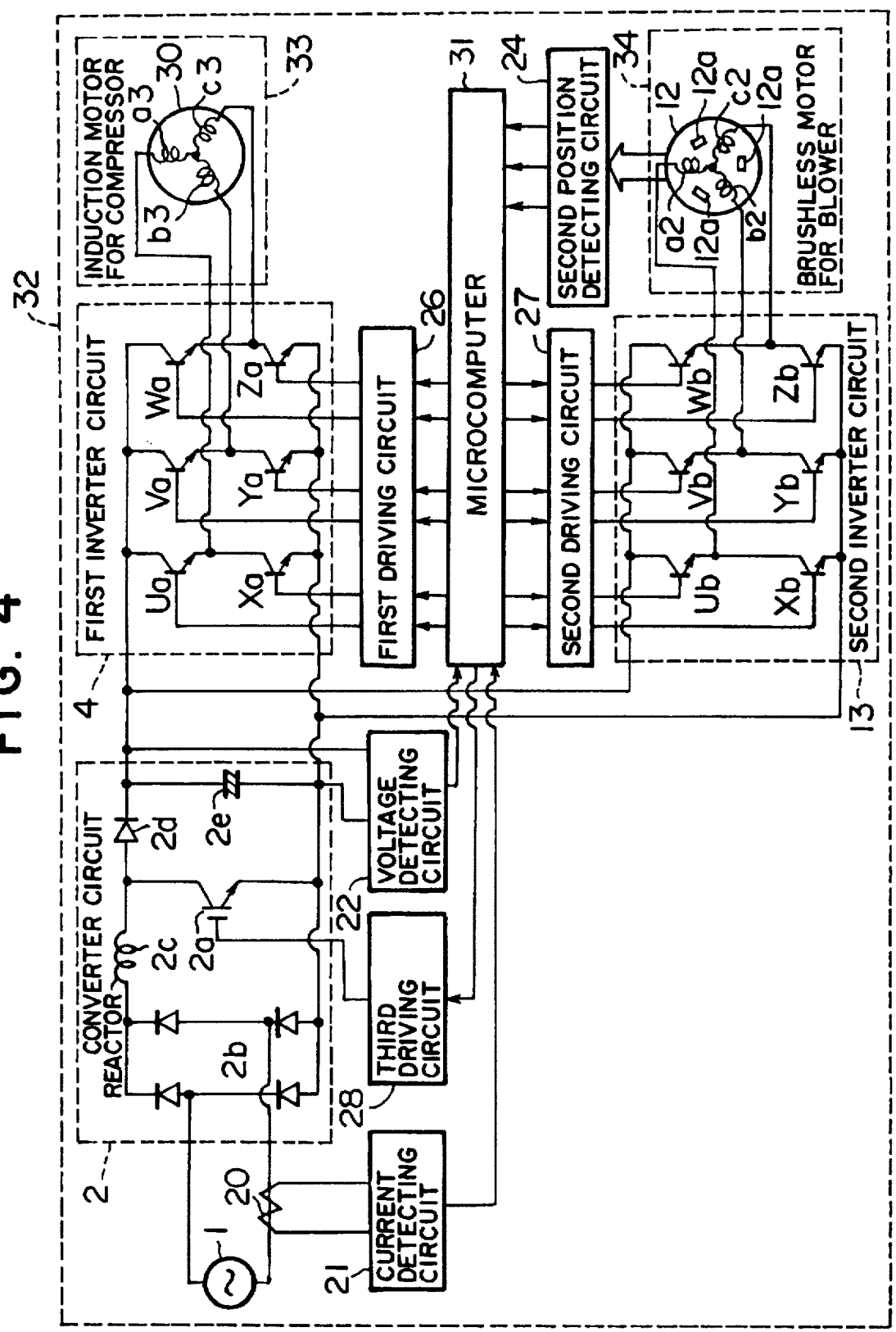
FIG. 4 is a schematic block diagram of a control apparatus of an air conditioner showing a modified embodiment of the invention.

FIG. 4 is a schematic circuit diagram of the control apparatus 32 of the air conditioner showing a modified embodiment of the invention. In the diagram, the same and corresponding portions as those in FIG. 1 are designated by the same reference numerals and their overlapped descriptions are omitted.

In the embodiment, an induction motor 30 is used in place of the first brushless motor 3 for the compressor 33. The converter circuit 2 and the second brushless motor 12 for the blower 34 are similar to those shown in the foregoing embodiment.

In FIG. 4, the control apparatus of the air conditioner has a microcomputer 31 which has the functions of the microcomputer 25 shown in FIG. 1 and controls the rotation of the induction motor 30 for the compressor 33.

Figure 5:
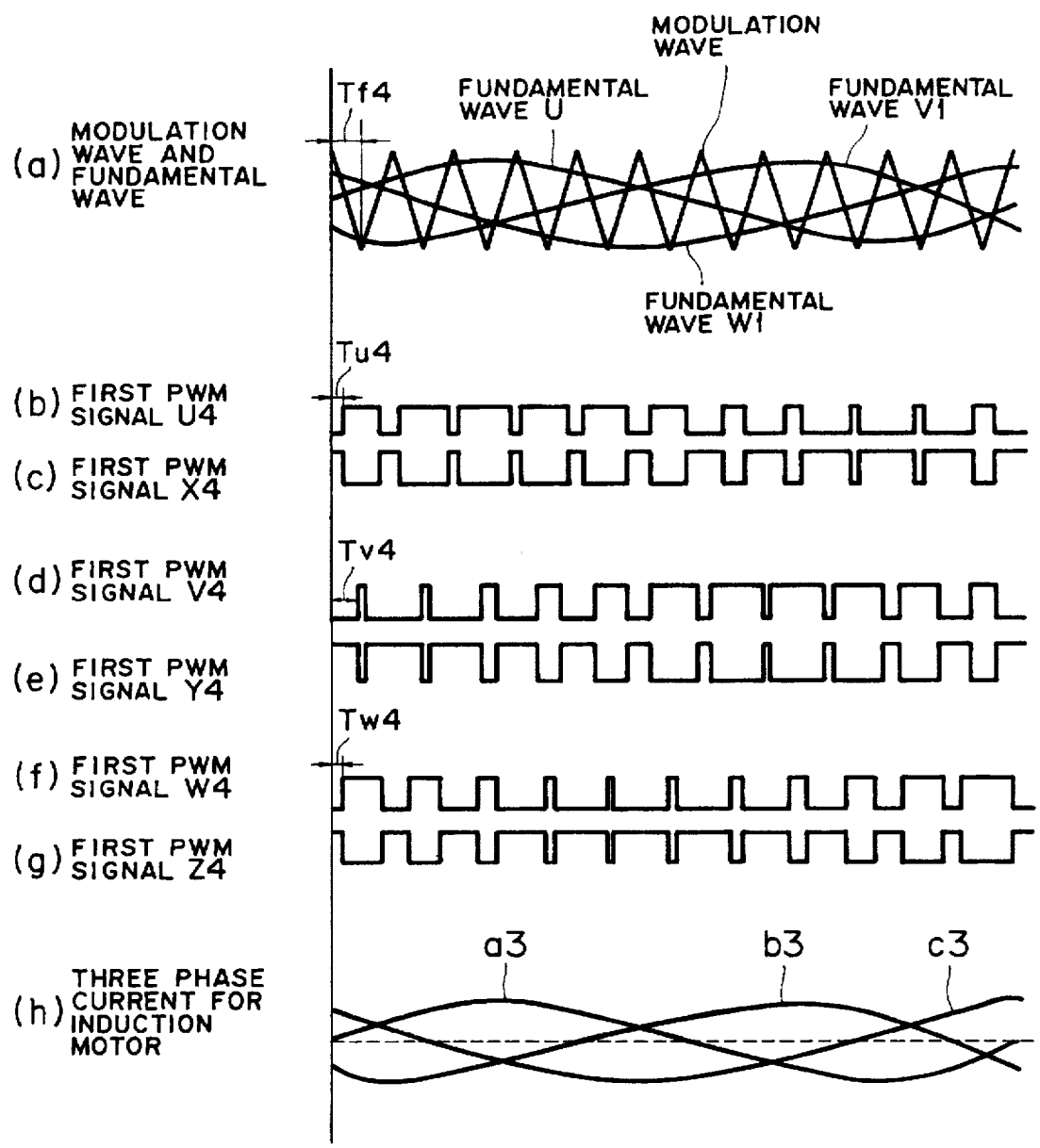
FIG. 5 is a schematic timing chart for explaining the operation and control method of the control apparatus shown in FIG. 4.

First, when the rotation of the induction motor 30 is controlled, the microcomputer 31 compares a modulation wave shown in (a) in FIG. 5 with fundamental waves U, V, and W every half period Tf4 and obtains intersection points between the modulation wave and the fundamental waves U, V, and W, respectively. On the basis of the intersection points obtained, times Tu4, Tv4, and Tw4 up to the intersection points shown in (a) in FIG. 5 are obtained. On the basis of the times Tu4, Tv4, and Tw4 obtained, control signals (PWM signals) U4, X4, V4, Y4, W4, and Z4 (X4, Y4, and Z4 are the signals obtained by inverting U4, V4, and W4) are generated and outputted [shown in (b) and (g) in FIG. 5].

The first driving circuit 26 which received the first PWM signals U4, X4, V4, Y4, W4, and Z4 from the microcomputer 31 turns on/off six transistors Ua, Xa, Va, Ya, Wa, and Za constructing the first inverter circuit 4 on the basis of the drive signals U4, X4, V4, Y4, W4, and Z4. As mentioned above, since the transistors Ua, Xa, Va, Ya, Wa, and Za of the first inverter circuit 4 are on/off controlled, the output DC voltage from the converter circuit 2 is converted to the 3-phase alternating currents. The 3-phase alternating currents are supplied to 3-phase windings a3, b3, and c3 of the induction motor 30 [shown in (h) in FIG. 5], so that the induction motor 30 is rotated.

In this instance, to set the induction motor 30 to a predetermined rotational speed, the microcomputer 31 sets the fundamental waves U, V, and W to predetermined amplitudes and predetermined frequencies in accordance with the predetermined rotational speed of the induction motor 30, thereby varying the intersection points between the modulation wave and the fundamental waves U, V, and W and varying Tu4, Tv4, and Tw4 mentioned above. Thus, pulse widths (on/off timings) of the control signals (PWM signals) U4, X4, V4, Y4, W4, and Z4 are varied by such variation and are outputted from the microcomputer 31. The 3-phase alternating currents to be supplied from the first inverter circuit 4 to the induction motor 30 are subsequently set to predetermined voltages and predetermined frequencies. The induction motor 30 is rotated at a predetermined rotational speed.

The microcomputer which is used in the control apparatus of the invention will now be specifically explained. A whole construction of the control apparatus is shown in FIG. 1.

Figure 6:
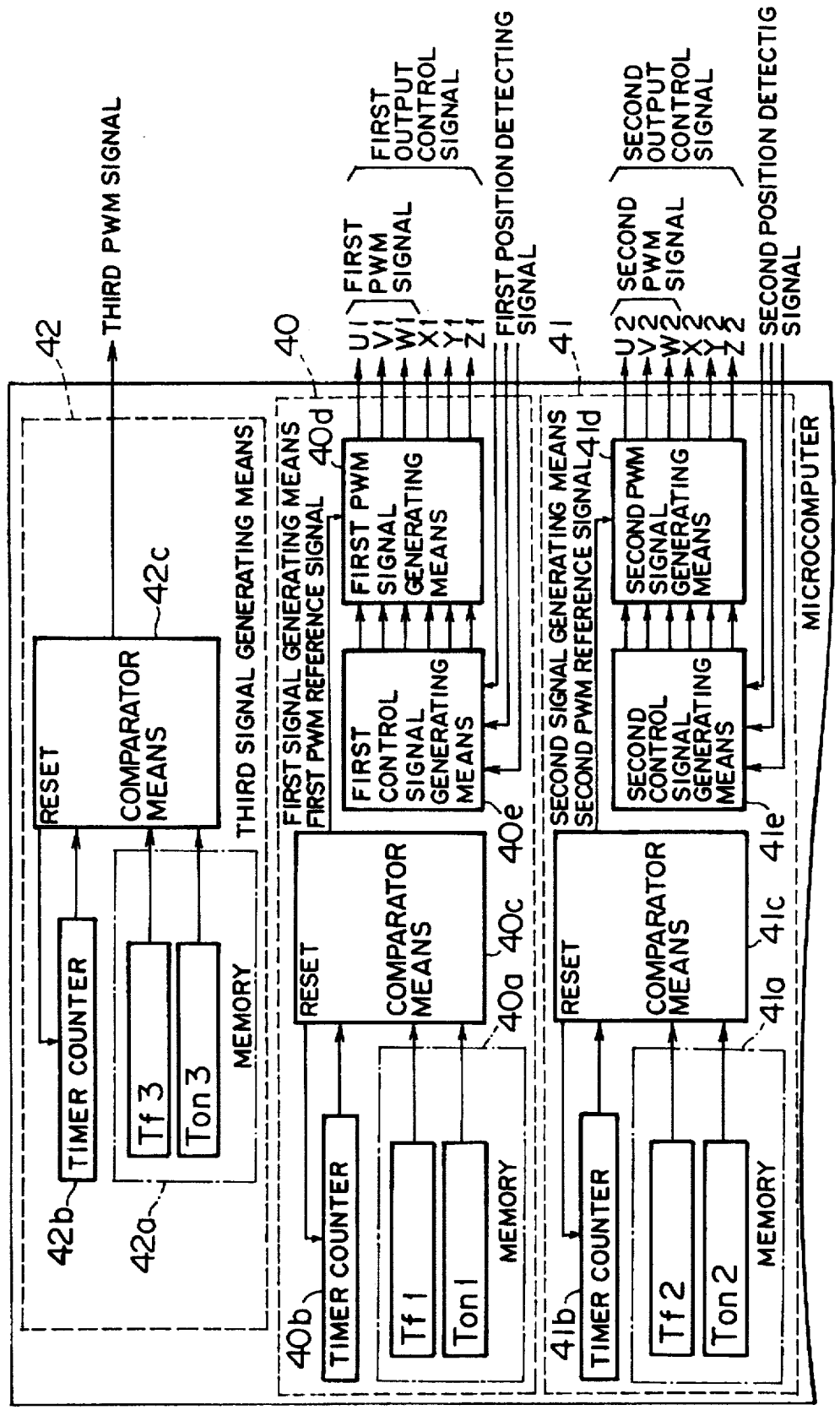
FIG. 6 is a schematic constructional diagram of a microcomputer which is used in the control apparatus of the air conditioner shown in FIG. 1.

FIG. 6 is a specific constructional block diagram of signal generating means in the microcomputer 25 shown in FIG. 1. In FIG. 6, the microcomputer 25 has first to third signal generating means 40, 41, and 42.

The third signal generating means 42 generates the third PWM signal to control the IGBT 2a of the converter circuit 2. The first and second signal generating means 40 and 41 respectively generate the first and second control signals to control the first and second inverter circuits 4 and 13. The first and second control signals and the third PWM signal are outputted from the microcomputer 25.

The third signal generating means 42 will now be described. The third signal generating means 42 generates the third PWM signal shown in (a) in FIG. 7. In this instance, the microcomputer 25 sets a period Tf3 and an ON time Ton3 [shown in (a) in FIG. 7] of the third PWM signal into an internal memory 42a and resets a timer counter 42b and starts. At the same time, the microcomputer 25 sets the third PWM signal that is outputted from comparator means 42c to the H level (on).

The comparator means 42c compares a count value of the timer counter 42b with Ton3 in the memory 42a. When they coincide, an output signal (third PWM signal) of the comparator means 42 is set to the L level (off).

After that, when Tf3 in the memory 42a coincides with the count value of the timer counter 42b, the timer counter 42b is reset and is restarted. At the same time, the third PWM signal that is outputted from the comparator means 42c is set to the H level (on). For such a period of time, the value of Ton3 in the memory 42a is rewritten to the ON time data of the next pulse by the microcomputer 25, so that the pulse width of the third PWM signal which is outputted changes.

Figure 7:
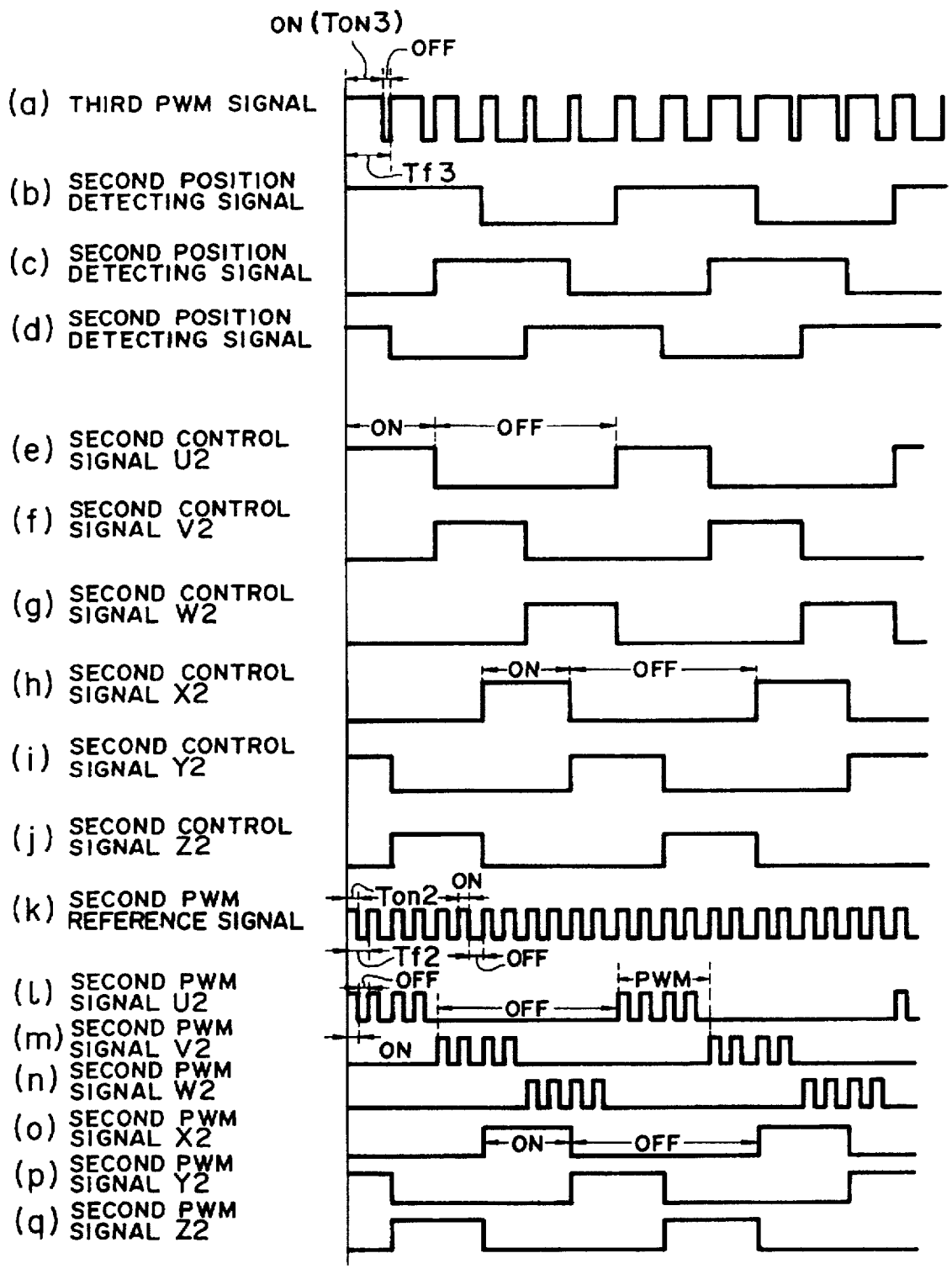
FIG. 7 is a schematic timing chart for explaining the operation of the microcomputer shown in FIG. 6.

By repeating the foregoing processes, the third PWM signal shown in (a) in FIG. 7 is generated and is outputted from the microcomputer 25.

First and second control signal generating means 40e and 41e of the first and second signal generating means 40 and 41 receive the first and second position detecting signals [shown in (b) to (d) in FIG. 7] of the first and second brushless motors 3 and 12, respectively. On the basis of the position detecting signals, the control signals U1, V1, W1, X1, Y1, and Z1 and control signals U2, V2, W2, X2, Y2, and Z2 shown in (e) to (j) in FIG. 7 for turning on as desired the transistors Ua, Va, Wa, Xa, Ya, Za, Ub, Vb, Wb, Xb, Yb, and Zb of the first and second inverters 4 and 13 are generated so as to rotate the first and second brushless motors 3 and 12, respectively.

In memories 40a and 41a, timer counters 40b and 41b, and comparator means 40c and 41c, a first PWM reference signal and a second PWM reference signal [shown in (k) in FIG. 7] of predetermined on/off ratios are generated at frequencies higher than the frequency of each of the generated control signals, respectively. In this instance, periods Tf1 and Tf2 [shown in (k) in FIG. 7] of the first and second PWM reference signals are set into the memories 40a and 41a. Further, predetermined ON times Ton1 and Ton2 of the first and second PWM reference signals are set into the memories 40a and 41a, respectively. The timer counters 40b and 41b are reset and started and, at the same time, the first and second PWM reference signals are set to the H level (on).

In the comparator means 40c and 41c, count values of the timer counters 40b and 41b are compared with the values of the ON times Ton1 and Ton2 of the first and second PWM reference signals in the memories 40a and 41a, respectively. When they coincide, the corresponding PWM reference signal is set to the L level (off).

After that, count values of the timer counters 40b and 41b are compared with values of the periods Tf1 and Tf2 of the first and second PWM reference signals in the memories 40a and 41a, respectively. When they coincide, the timer counters 40b and 41b are reset and restarted. Simultaneously therewith, the first and second PWM reference signals are set to the H level (on). After that, by repeating processes similar to those mentioned above, the first and second PWM reference signals are generated [shown in (k) in FIG. 7].

First and second PWM signal generating means 40d and 41d input the generated control signals and also input the generated first and second PWM reference signals. Among the inputted control signals, the ON portions of the control signals U1, V1, W1, U2, V2, and W2 to turn on as desired the transistors Ua, Va, Wa, Ub, Vb, and Wb of at least one of the upper and lower arms, in the example, the upper arm of the first and second inverter circuits 4 and 13 are set to the PWM signals by the first and second PWM reference signals.

In the first and second PWM signal generating means 40d and 41d, logical operations such as ANDs or ORs are performs between the control signals U1, V1, W1, U2, V2, and W2 as PWM signals and the first and second PWM reference signals, in the example, the ANDs are obtained. In case of the second PWM signal generating means 41d, as shown in (l) to (n) in FIG. 7, the second control signals U2, V2, and W2 are set to the second PWM reference signal [shown in (k) in FIG. 7] only when the output signals are at the H level.

Thus, the ON portions of the control signals of the upper arms of the first and second inverter circuits 4 and 13 are set to the first and second PWM reference signals, respectively. The first and second PWM signals U1, V1, and W1 and U2, V2, and W2 shown in (l) to (n) in FIG. 7 in which the ON portions are set to the first and second PWM reference signals and the other first and second control signals X1, Y1, and Z1 and X2, Y2, and Z2 shown in (o) to (q) in FIG. 7 are generated by the first and second PWM signal generating means 40d and 41d, respectively. The twelve first and second output control signals generated are then output from the microcomputer 25.

The first and second control signal generating means 40e and 41e generate the control signals to the first and second PWM signal generating means 40d and 41d on the basis of the first and second position detecting signals, respectively.

The microcomputer 25 varies as desired the ON times Ton1 and Ton2 of the first and second PWM reference signals which are set into the memories 40a and 41a, thereby constantly rotation-controlling the first and second brushless motors 3 and 12 at predetermined rotational speeds, respectively.

In the above embodiment, the periods Tf1, Tf2, and Tf3 of the first to third PWM signals have individually been set. However, two or three of those periods can be also set to a common period. In this case, the memories, timer counters, and comparator means can be also commonly constructed.

Figure 8:
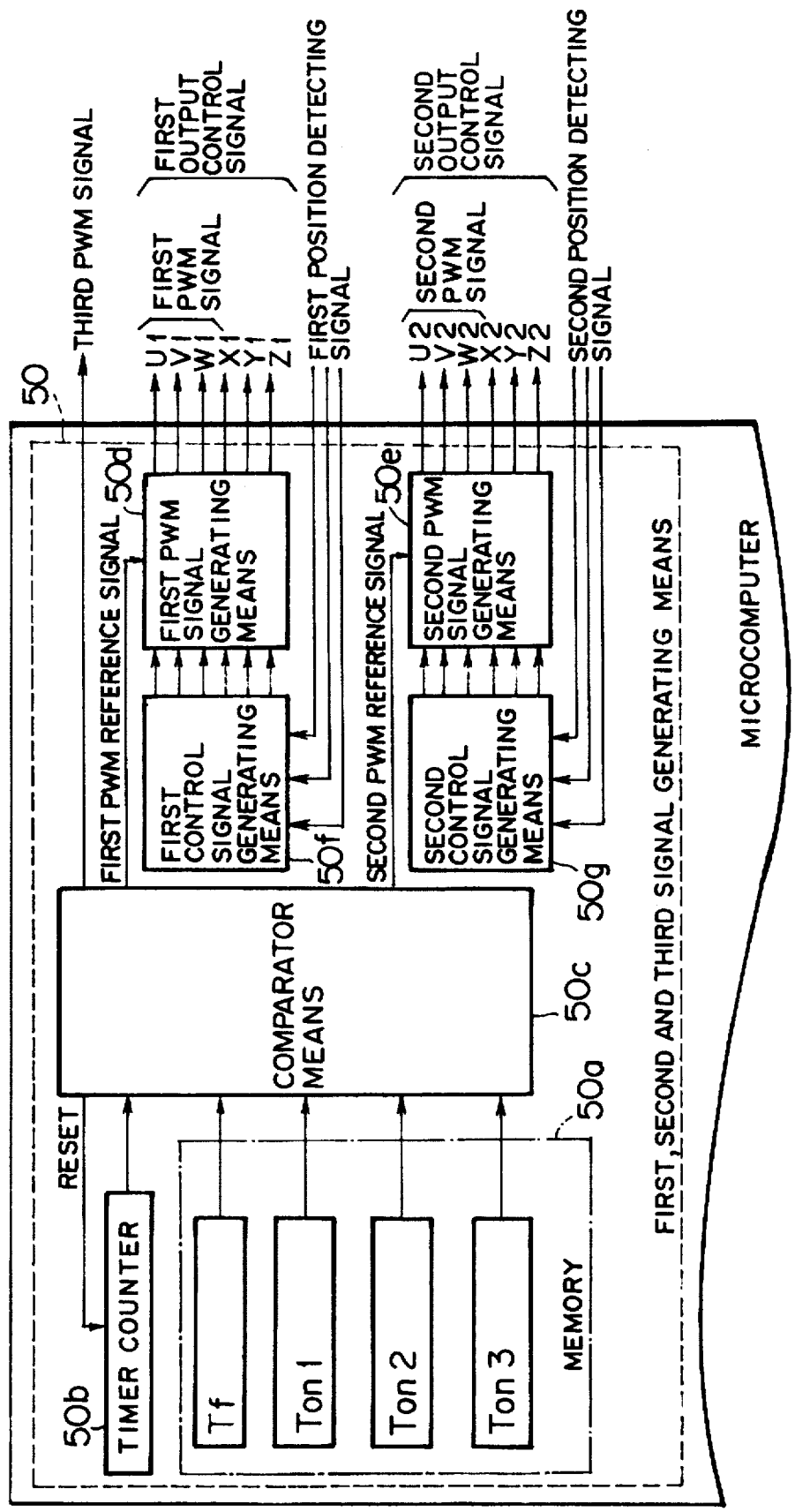
FIG. 8 is a schematic constructional diagram of a microcomputer which is used in the control apparatus of the air conditioner shown in FIG. 1.

FIG. 8 shows an example in the case where the above three periods are commonly set. As will be obviously understood from FIG. 8, first, second, and third signal generating means 50 of the microcomputer 25 comprise a memory 50a or setting the period Tf of the PWM signal, ON time Ton1 of the first PWM signal, ON time Ton2 of the second PWM signal, and ON time Ton3 of the third PWM signal, a timer counter 50b comparator means 50c first and second PWM signal generating means 50d and 50e and first and second control signal generating means 50f and 50g.

That is, the memory 50a corresponds to the memory shown in FIG. 6. The timer counter 50b corresponds to the timer counter shown in FIG. 6. The comparator means 50c corresponds to the comparator means shown in FIG. 6. The first and second PWM signal generating means 50d and 50e correspond to the first and second PWM signal generating means shown in FIG. 6. The first and second control signal generating means 50f and 50g correspond to the first and second control signal generating means shown in FIG. 6. Since the operations of the signal generating means in such a construction are also similar to those mentioned above, their descriptions are omitted here.

Figure 9:
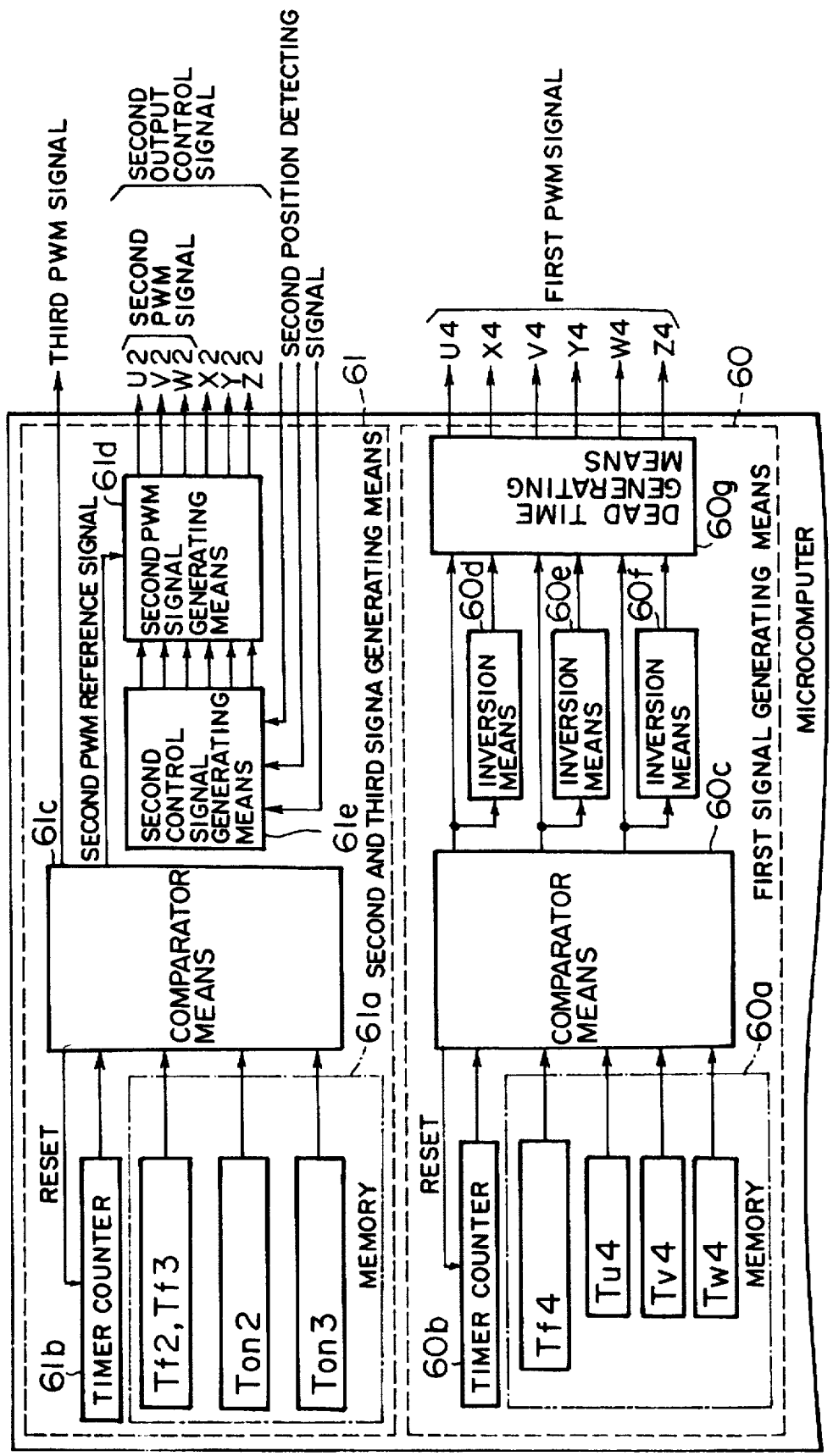
FIG. 9 is a schematic constructional diagram of a microcomputer which is used in the control apparatus of the air conditioner shown in FIG. 4.

FIG. 9 is a schematic block diagram showing a construction of the signal generating means in the microcomputer 31 shown in FIG. 4. In the example, first signal generating means 60 is provided to control the induction motor 30 for the compressor 33 shown in FIG. 4. The periods of the second and third PWM signals are set to the same period. Second and third signal generating means 61 for generating the second and third PWM signals are unified. The second and third signal generating means 61 have a construction similar to that of the first, second, and third signal generating means shown in FIG. 8.

A whole construction of the control apparatus of the air conditioner is shown in the schematic block diagram of FIG. 4. The operations are shown in the timing charts of FIG. 5.

The first signal generating means 60 of the microcomputer 31 will be first described. In the half period Tf4 of the modulation wave, intersection points between the modulation wave and the fundamental waves U, V, and W are obtained [refer to (a) in FIG. 5] and the times Tu4, Tv4, and Tw4 up to the intersection points are obtained [refer to (b), (d), and (f) in FIG. 5].

The microcomputer 31 sets the half period Tf4 of the modulation wave into a memory 60a and also sets the obtained values Tu4, Tv4, and Tw4 into the memory 60a.

A timer counter 60b is reset and started. At the same time, three signals U4, V4, and W4 [refer to (b), (d), and (f) in FIG. 5] which are outputted from a comparator means 60c are set to the L level.

The comparator means 60c compares a count value of the timer counter 60b with the values Tu4, Tv4, and Tw4 in the memory 60a, respectively. When they coincide, each output signal is inverted. When the count value of the timer counter 60b coincides with the value in the memory 60a as a half period Tf4 of the modulation wave, the comparator means 60c resets the timer counter 60b. For such a period of time, the intersection points between the modulation wave in the next half period of the modulation wave and the fundamental waves U, V, and W are obtained in the microcomputer 31. From the intersection points, the new values Tu4, Tv4, and Tw4 are obtained and are again set into the memory 60a simultaneously with the reset of the timer counter 60b. The timer counter 60b is restarted.

By repeating the above processes, the PWM signals U4, V4, and W4 shown in FIG. 5 are outputted from the comparator means 60c.

The above three PWM signals U4, V4, and W4 are respectively inverted by inversion means 60d, 60e, and 60f and become the PWM signals X4, Y4, and Z4 shown in (c), (e), and (g) in FIG. 5. The inverted signals X4, Y4, and Z4 and non-inversion signals U4, V4, and W4 are inputted to dead time generating means 60g. The dead time generating means 60g is delay means. In order to prevent that the two transistors (Ua and Xa; Va and Ya; Wa and Za) of the same phase of the first inverter circuit 4 are simultaneously turned on and the power supply is short-circuited, for instance, the leading edges of the inputted signals U4, V4, W4, X4, Y4, and Z4 are delayed by a predetermined time, thereby preventing that the two transistors of the same phase are simultaneously set to the H level (on).

As mentioned above, six PWM signals U4, V4, W4, X4, Y4, and Z4 as first control signals are generated from the first signal generating means 60 and are outputted from the microcomputer 31.

At the same time, in order to set the induction motor 30 to a predetermined rotational speed, the microcomputer 31 varies the fundamental waves U, V, and W to predetermined amplitudes and predetermined frequencies in accordance with the predetermined rotational speed, thereby varying the intersection points between the modulation wave and the fundamental waves. Thus, the values Tu4, Tv4, and Tw4 which are set into the memory 60a are varied, the pulse widths (on/off timings) of the six PWM signals are varied and outputted, and the rotational speed of the induction motor 30 is varied, thereby rotating the induction motor at a predetermined rotational speed. The half period Tf4 of the modulation wave which is set into the memory 60a can be also varied as necessary.

Since the second and third signal generating means 61 have already been described in FIG. 8, the description of the operations are omitted here. In this case, in FIG. 9, the memory 61a corresponds to the memory 50a shown in FIG. 8, the timer counter 61b corresponds to the timer counter 50b shown in FIG. 8, the comparator means 61c corresponds to the comparator means 50c shown in FIG. 8, the second PWM signal generating means 61d corresponds to the second PWM signal generating means 50e shown in FIG. 8, and the second control signal generating means 61e corresponds to the second control signal generating means 50g shown in FIG. 8.

What is claimed is:

1. A method of controlling a plurality of motors of an air conditioner having a converter for converting AC power to DC power, comprising the steps of: setting an input alternating current waveform to a sine wave having the same phase as that of an input voltage of the alternating current waveform using a switching means; driving a plurality of motors to operate at least a compressor and a blower of the air conditioner; converting the converted DC power to AC power using an inverter associated with each of the respective motors and supplying the AC power to the respective motors; and controlling at least the compressor and the blower of the air conditioner with a single microcomputer by outputting a control signal from the microcomputer for controlling the switching means in accordance with the input alternating current and the output DC voltage of the converter, and outputting control signals from the microcomputer for controlling the plurality of inverters.

2. A method according to claim 1; wherein the plurality of motors comprise brushless motors.

3. A method according to claim 1; wherein the plurality of motors comprise at least one brushless motor and at least one induction motor.

4. A method of controlling a plurality of motors of an air conditioner having a converter for converting AC power to DC power, comprising the steps of: setting an input alternating current waveform to a sine wave having the same phase as that of an input voltage of the alternating current waveform using a switching means; driving a plurality of motors for operating at least a compressor and a blower of the air conditioner; converting the converted DC power to AC power and supplying the AC power to the respective motors using an inverter associated with each of the respective motors; and controlling at least the compressor and the blower of the air conditioner using a single microcomputer by outputting a PWM signal from the microcomputer to control the switching means in accordance with the input alternating current and the output DC voltage of the converter, and outputting PWM signals from the microcomputer to control the plurality of inverters.

5. A method according to claim 4; wherein the plurality of motors comprise brushless motors.

6. A method according to claim 4; wherein the plurality of motors comprise at least one brushless motor and at least one induction motor.

7. An apparatus for controlling a plurality of motors of an air conditioner, comprising: a converter for converting AC power to DC power and setting an input alternating current waveform to a sine wave having the same phase as that of an input voltage of the alternating current waveform using a switching means; a plurality of motors for driving at least a compressor and a blower of the air conditioner; a plurality of inverters, each for converting the converted DC power to AC power and supplying the AC power to a respective motor; a microcomputer for controlling the compressor and the blower of the air conditioner; converter control means for outputting a control signal from the microcomputer for controlling the switching means in accordance with the input alternating current and the output DC voltage of the converter; and inverter control means for outputting control signals from the microcomputer to control the plurality of inverters; wherein the plurality of inverters are each connected in parallel and each receives the converted DC power output from the converter.

8. An apparatus according to claim 7; wherein the plurality of motors comprise brushless motors.

9. An apparatus according to claim 7; wherein the plurality of motors comprise at least one brushless motor and at least one induction motor.

10. An apparatus for controlling a plurality of motors of an air conditioner, comprising: a converter having switching means for converting AC power to DC power and setting an input alternating current waveform to a sine wave having the same phase as that of an input voltage of the alternating current waveform; a plurality of brushless motors for driving at least a compressor and a blower of the air conditioner; a plurality of inverters, each for converting the converted DC power to AC power and supplying the AC power to a respective motor; a microcomputer for controlling at least the compressor and the blower of the air conditioner; converter control means for outputting a control signal from the microcomputer to control the switching means in accordance with the input alternating current and the output DC voltage of the converter; and inverter control means for outputting control signals from the microcomputer to control the plurality of inverters in accordance with a rotation speed of rotors of the respective plurality of brushless motors; wherein the plurality of inverters are connected in parallel and each receives the converted DC power output from the converter.

11. An apparatus for controlling a plurality of motors of an air conditioner, comprising: a converter having switching means for converting AC power to DC power and setting an input alternating current waveform to a sine wave having the same phase as that of an input voltage of the alternating current waveform; a plurality of motors for driving at least a compressor and a blower of the air conditioner, at least one of the motors being an induction motor and at least one other motor being a brushless motor; a plurality of inverters, each for converting the converted DC power to AC power and supplying the AC power to a respective motor; a microcomputer for controlling the compressor and the blower of the air conditioner; converter control means for outputting a control signal to control the switching means from the microcomputer in accordance with at least the input alternating current and the output DC voltage of the converter; and inverter control means for outputting control signals to control the conductivity state of individual switching elements of the inverters for supplying AC power to the respective motors from the microcomputer on the basis of a rotation speed of rotors of the respective motors and for outputting a control signal to control the inverter for supplying AC power to the induction motor; wherein the plurality of inverters are connected in parallel and receive the converted DC power output from the converter.

12. A motor control device comprising: means for correcting a distorted AC line signal to have a sinusoidal characteristic; a converter for converting the corrected AC line signal into a constant DC signal; a plurality of motors for driving corresponding loads; a single microcomputer for controlling the plurality of motors; position detecting means for detecting a position of a rotor of each of the motors and outputting a respective position signal in accordance therewith; a plurality of parallel-connected inverters, each for driving a respective motor and having individual switching elements for switching a connection between the converter and a coil of a respective motor; drive signal generating means for generating drive signals for individually driving the respective motors in response to a corresponding position signal for each motor input from the position detecting means to the microcomputer, whereby the respective drive signals are effective to selectively drive the switching elements of the respective inverters such that rotors of respective motors are rotated in response to corresponding position signals to maintain a desired rotation speed, the connection between the converter and the respective motors being switched so that a DC voltage from the converter is converted into an AC voltage which is applied to rotate the rotors of the respective motors at a desired rate; and chopping signal generating means for generating chopping signals each having a predetermined period for combining with selected drive signals for selectively driving associated switching elements of the respective inverters, the chopping signals having a higher frequency than that of the drive signals; wherein the drive signals and the chopping signals are generated and output by the microcomputer to the respective inverters to convert the DC voltage to an AC voltage and to effect voltage chopping, and the chopped AC voltage is applied to respective motors to control the rotation speed of rotors of the respective motors.

13. A motor control device according to claim 12; wherein the microcomputer includes means for calculating a rotation speed of a rotor of a respective motor in accordance with a corresponding position signal, and means for varying the period of a corresponding chopping signal so that the rotation speed of the rotor is made equal to a predetermined rotation speed.

14. A motor control device according to claim 13; wherein the chopping means includes means for performing a logical function between a respective drive signal and a corresponding chopping signal for combining selected drive signals and chopping signals to subject the selected drive signals to chopping.

15. A motor control device according to claim 12; wherein at least one of the plurality of motors is an induction motor and at least another of the plurality of motors is a brushless motor, one of the induction motor and the brushless motor being connectable in use to drive a compressor of an air conditioning system and the other being connectable in use to drive a blower of an air conditioning system.

16. A motor control device according to claim 15; wherein the microcomputer includes the drive signal generating means which comprises first drive signal generating means for generating the drive signals for controlling the inverter of the at least one induction motor, and second drive signal generating means for generating the drive signals for controlling the inverter of the at least one brushless motor, the first drive signal generating means comprising signal generating means for generating a plurality of signals including one or more fundamental waves and a modulating wave for selectively driving the switching elements of the inverter of the at least one induction motor for controlling the induction motor by controlling the frequency of the signals, and the second drive signal generating means comprising means for generating second drive signals for selectively driving individual switching elements of the inverter of the at least one brushless motor in response to the position signal for controlling the brushless motor, signal generating means for generating chopping signals having a predetermined frequency higher than that of the second drive signals, generating the timing of the chopping signals by a timer, and chopping means for chopping the selected drive signals for selectively driving corresponding switching elements of the inverter of the at least one brushless motor.

17. A motor control device according to claim 12; wherein the microcomputer comprises the drive signal generating means for generating the driving signals for selectively actuating individual switching elements of the respective inverters so that rotors of each respective motor are rotated in response to corresponding position signals, and also comprises the chopping signal generating means for generating respective chopping signals having a predetermined frequency higher than that of corresponding drive signals, and chopping means for subtracting the chopping signals from selected drive signals for selectively driving the switching elements of the respective inverter.

18. A control device for controlling a blower motor and a condenser motor of an air conditioner, comprising: a a converter for converting a distorted AC line signal into a constant DC voltage; a plurality of motor driving circuits, each having an inverter for converting the DC voltage from the converter into an AC voltage and applying the AC voltage to respective windings of a condenser motor and a blower motor of the air conditioner; a plurality of position detecting means, each for detecting a rotational position of a rotor of a respective one of the condenser motor and the blower motor and generating a respective position signal dependent thereon; a plurality of switch driving circuits each receptive of a corresponding one of a plurality of driving signals for selectively driving individual switch elements of each corresponding inverter; and a single microcomputer for controlling the rotation of the condenser motor and the blower motor by generating the plurality of driving signals in dependence on the respective position signals to drive individual switch elements of each inverter so that the DC voltage from the converter is converted and supplied as the AC voltage to the respective windings depending on the rotational position of the condenser motor and the blower motor.

19. A control device according to claim 18; wherein the converter has a positive terminal and a negative terminal; and wherein the switch elements of each inverter are arranged in an upper arm comprising a plurality of switch elements for switching a connection between the positive terminal of a corresponding power circuit and the respective windings of one of the condenser motor and the blower motor, and a lower arm comprising a plurality of switch elements for switching a connection between the negative terminal of the corresponding power circuit and the respective windings of the same one of the condenser motor and the blower motor.

20. A control device according to claim 19; wherein the single microcomputer includes chopping signal generating means for generating a chopping signal for controlling the inverters so that the DC voltage from the converter is converted and simultaneously chopped to a predetermined AC voltage supplied to the respective windings of the condenser motor and the blower motor.

21. A control device according to claim 20; wherein the single microcomputer includes means for calculating a rotation speed of a rotor of each of the motors in accordance with a respective position signal, means for comparing the respective calculated rotation speed of a respective rotor with a predetermined rotation speed, and means for controlling the chopping signal generating means so that the chopping signal is effective to control the rotation speed of respective rotors so that the rotation speed of respective rotors equal to the corresponding predetermined rotation speed.

22. A control device according to claim 18; wherein at least one of the condenser motor and the blower motor is an induction motor.

23. A control device according to claim 18; wherein at least one of the condenser motor and the blower motor is a brushless motor.

* * * * *